United States Patent Office 3,225,848
Patented Dec. 28, 1965

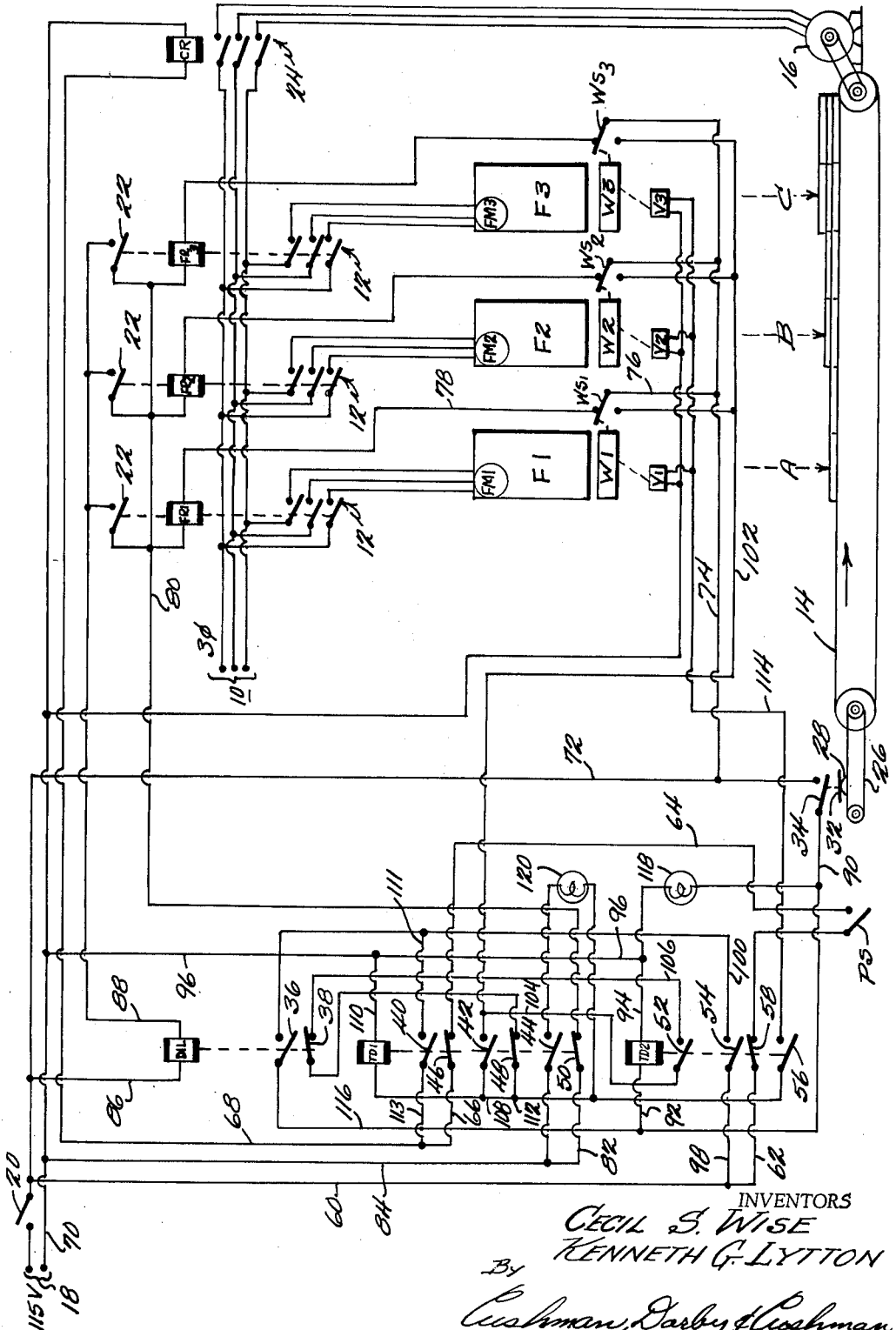

3,225,848
AUTOMATIC CONTROL SYSTEM FOR
BLENDING EQUIPMENT
Cecil S. Wise, Dallas, and Kenneth G. Lytton, Gastonia, N.C., assignors to Fiber Controls Corporation, Gastonia, N.C., a corporation of North Carolina
Filed Nov. 19, 1962, Ser. No. 238,385
8 Claims. (Cl. 177—80)

This invention relates to a system for controlling operation of equipment to prevent errors therein, and more particularly to a system for controlling operation of equipment of the type that collects material while a given quantity of a predetermined characteristic related to desired operation of the equipment is being measured and to effect release of the collected material onto movable receiving means invariably during each cycle so that the receiving means moves away from the receiving station with all the material required.

This invention has particular applicability in the field of blending fibers, especially textile fibers, for example by weight, but limitation to either fibrous material or weight measurement is not intended even though this description proceeds in relation thereto.

Modern fabrics frequently are made from yarn which is a blend of different types or grades of fibers, for example natural fibers, such as wool and cotton, and synthetic fibers, such as nylon, rayon, acetate, etc.

It is necessary in the preparation of multi-fiber fabrics to obtain the predetermined quantities of the different types of materials once every cycle to prevent a mis-blend in the fabric being made.

There is disclosed and claimed in the copending application of Kenneth G. Lytton et al., Serial No. 348,406, filed April 13, 1953, now Patent Number 3,071,202, apparatus and a system for effecting the desired proportioning and blending of different fibers. Although the system and apparatus thereof has proved its worth many times over, there are instances wherein a mis-blend may be effected because of malfunctions of the braking equipment used therewith to stop the conveyer at the proper time. As a matter of background information, the conveyor system specifically described therein operates a discharge or dump switch by virtue of a cam or lug mounted on a timing chain and engaging and disengaging an arm coupled to the switch. Whenever the conveyor moves a predetermined distance, the cam associated with the conveyor causes the switch to be operated, and in a particular embodiment of that application it is necessary for the conveyor to stop quickly enough to maintain the cam and switch arm in contact. For this reason, brakes, for example electromagnetic brakes, have been utilized with the conveyer or conveyer motor, and such brakes are automatically operated to stop the conveyer relatively quickly. When operating properly, such a brake effects the ends desired, but considerable mechanical trouble is too frequently encountered with the brake system. The brake easily becomes loose enough to allow the cam to coast off the cam follower and return the discharge switch to its normal position allowing the system to restart without a dump cycle.

It is the primary object of this invention to eliminate the aforesaid difficulties with prior systems by effecting an interlock which prevents movement of the conveyer during each cycle until all of the different materials have been weighed out and the weighing pans are ready to discharge their respective measured quantities of materials, even if the conveyer operated discharge switch is reoperated before that time.

Another object of this invention is the provision of interlock means which remembers closure of the conveyer operated discharge switch until such time as the interlock is de-energized by virtue of the sensing of all weighing containers having fully measured out their respective quantities of materials, with the closure of the conveyer operated discharge switch being effective to de-energize the conveyer mover, but reopening of the discharge switch being ineffective to re-energize that mover as long as the interlock means remains energized and remembers sensing of the closure of the discharge switch.

Other objects, features, and advantages of this invention will become apparent to one of ordinary skill in the art upon reading the appended claims and the following detailed description of the invention in view of the attached schematic drawing relating to an exemplary embodiment of the invention.

In many respects, particularly those relating to mechanical features, the equipment referred to herein may be similar to that in the above mentioned Lytton et al., patent, and for this reason the feeders F1, F2, and F3 and their respective weighing containers or weigh pans W1, W2, and W3 are diagrammatically shown in box form. Structural details of suitable feeders and weigh pans (along with weighing mechanisms) may be obtained from that Lytton et al., patent. As is fully explained in that application, each feeder supplies its respective type of material into the associated weigh pan when the respective feed motor FM1, FM2, and FM3 is energized. Each of these motors may be energized from a three-phase source 10 when the corresponding feed relay FR1, FR2, FR3 is energized to close its three normally open set of contacts or switches 12. Since a specific purpose of this equipment is to discharge onto conveyer 14 given quantities of different types of material, there will need to be a measuring system involved to effect the proportioning or blending of the different materials as desired. In the specific embodiment being described, weight is that characteristic of the material that is measured, but it is to be understood that this invention encompasses in its concept the measurement by the equipment of a given quantity of a predetermined characteristic related to desired operation of the equipment. In other words, a characteristic of the different materials other than weight, such as dimension, may be that which is measured, or some other operating characteristic related to the equipment itself, such as feeding times for the respective materials, may be employed.

When the given quantity of the predetermined characteristic is measured by the measuring means, such as the weighers (not shown) in weigh pans W, the material collected therein is ready to be released onto conveyer 14. Release from the different weigh pans may be effected in any desired manner, for example by the reversible electromagnetic door discharge means fully described in the aforesaid Lytton et al. patent, or pneumatically by the use of a solenoid operated air cylinder or valve which through desired linkages operates to hold the hinged doors of the respective weigh pans closed by air pressure in absence of energization of the solenoid. Such valves are indicated in the drawing by designations V1, V2, and V3, and it will be understood that when any one of these valves is energized, the consequence is operation of the discharge means of the respective weigh pan W, i.e., the release of pressure on its doors which in turn open by dropping down, to effect release of the material collected and measured by that weigh pan.

Several different modes of operation of the equipment so far described may be effected, all in accordance with the different modes described in the above mentioned Lytton et al. application. That is, the equipment may be operated to effect onto conveyer 14 a relatively continuous or non-interrupted stream of multi-layered fibers, or an interrupted stream thereof, as respectively shown in FIGURES 3 and 11 of that Lytton et al. application. In considering those figures it will be appreciated that besides the main conveyer, which in the present application is designated 14, there is shown in FIGURE 3 of that application not only the main conveyer but endless distributing conveyers respectively positioned under the weigh pans and timed relative to the main conveyer to effect the multi-layer continuous fiber stream. The present invention is intended to encompass that sort of operation, as well as that referred to with respect to FIGURE 11 of the aforesaid Lytton et al. application by the equipment of which either a continuous stream or interrupted stream of multi-layered fibers may be effected. For convenience, the separate collecting and distributing endless conveyers are not illustrated in the attached drawing, it being understood that operation of the single conveyer 14 by motor 16 and controls therefor is such to effect an exemplary stacking of fibers as shown in the drawing herewith.

For illustrative purposes, let it be assumed that feeder F1 supplies type A material, feeder F2 type B, and F3 type C. It will therefore be appreciated that the lower layer of material on conveyer 14 should be type A material, while the middle layer should be type B material, and the upper layer type C material. Let it further be assumed that each of the weight pans (or intervening distributing conveyers if used) discharges its output so that the material is evenly distributed over a length of the conveyer corresponding to the conveyer length of the weigh pan. To effect this, of course the conveyer must be running during the discharge period. For exemplary purposes again, let it be assumed that the distance between successive weight pans is equal to the conveyer length thereof. Consequently, two successive discharges of any one weigh pan onto the conveyer will occur before the next weigh pan can discharge its material on top of the first of those discharges. In other words, as shown in the drawing, there are two laterally disposed discharges of A material before the B material overlies the A material, and two such discharges of B material before the C material overlies the B material. Of course, this is only the situation at the beginning of a run, since by the time the last deposit of A material illustrated in the drawing receives a deposit of B material and then of C material, thereafter the conveyer will carry a continuous stream of stacks of A, B and C fibers.

Though not shown in the drawing, it is to be understood that the stacks of fibers, whether continuous or interrupted, are delivered by conveyer 14 to whatever type equipment desired, for example to the blender referred to in the above mentioned Lytton et al. application, or to a pneumatic circulating and distributing system such as disclosed and claimed in the copending application of Lytton et al., Serial No. 217,154, filed August 15, 1962.

As previously indicated, it is the purpose of the control system associated with the equipment above described, to prevent any possibility of there being other than all three types A, B and C of material (keeping to the example above utilized, but realizing that the number of different types of material may be increased or decreased as desired) in each stack of materials carried away from the last feeding and weigh pan station. One of the problems now and then encountered with prior systems is the restarting of the conveyer for a new cycle without emptying, or at least fully emptying, one or more if not all of the weigh pans onto the conveyer during the prior cycle. That is, the conveyer may be stepped to the next point where it should begin receiving material from each of the weigh pans, but before any of the weigh pans or at least all of them have had an opportunity to discharge onto the conveyer, it runs past the place where that material should be and another cycle is initiated to erroneously attempt effecting a further feeding of respective materials into the different weigh pans for the next cycle. This of course means that the different stacks of material on the conveyer at the areas thereof that were just missed, will consequently be lacking in one type of material. In keeping with the use of three different types of material, one of the stacks would be delivered by the conveyer with C type material missing, the second stack later would include only A and C type material, while the second stack after that would include only B and C type material, giving rise to an undesirable mis-blend.

For operating the controls of this system, a source 18 of power, for example, of 115 volts, may be employed when power switch 20 is closed to deliver current to a conveyer motor relay CR on a conditional basis, to dump interlock relay DIL, a first time delay relay TD1, and to a second time delay relay TD2, as well as to the previously mentioned feed relays FR1, FR2 and FR3. Besides the set of normally open contacts 12 for each of the feed relays FR, each such relay has a further normally open contact or switch 22 any one of which when closed will effect energization of the coil of interlock relay DIL in a manner presently explained. Conveyor relay CR is energizable to cause its contacts or set of three switches 24 to close and deliver 3-phase power from source 10 to motor 16, which via any desired type of drive causes forward movement of conveyer 14 in the direction shown by the arrow. Coupled to rotate with such movement of conveyer 14 is a so-called timing chain 26 which carries a cam lobe or lug 28 which is capable of operating switch arm 32 to move switch 34 from a normally open to a closed position. As will become apparent, closure of switch 34 by cam 28 effects deenergization of conveyer relay CR thereby immediately opening its switch contacts 24 and deenergizing motor 16. Though brakes of any desired type may be utilized with this motor or otherwise with conveyer 14, such are not a necessity in accordance with this invention, because conveyer 14 need not come to an immediate stop but may coast to a stop due to its momentum or inertia. Furthermore, the amount of coasting may even be to a sufficient degree whereby switch 34 reopens, for example due to gravity, cam 28 then no longer being in a position to maintain it closed. The reasons for this no brake requirement and coasting allowance will become more clear in the later description of the operation of the overall system.

The dump interlock relay DIL has associated with it two contacts or switches 36 and 38, which are respectively normally open and normally closed, as illustrated. In other words, switch 36 closes and switch 38 opens, when the coil of relay DIL is energized, and this is effected immediately without delay. Additionally, the switches return to their normal positions immediately upon de-energization of the relay coil.

As above indicated, relays TD1 and TD2 have respective time delays associated with them, but this is only during their release time, i.e., after they are de-energized, as opposed to their pull-in or energizing time. In other words, when relay TD1 is energized, its normally open contacts 40, 42 and 44 immediately close and its normally closed contacts 46, 48 and 50 immediately open, but these contacts or switches return to their normal (illustrated) positions not immediately upon de-energization of the coil of relay TD1 but only after a predetermined time elapses from that de-energization therof. A similar situation is true for the other time delay relay TD2. That is, its normally open contacts 52, 54 and 56 immediately close, and its normally closed contact 58 immediately opens, upon energization of the relay coil. On the other hand, these switch contacts of relay TD2 return to their normal (illustrated) positions only following a predetermined elapsed time after de-energization of the relay coil.

Associated with the weigh pans are respective switches WS1, WS2, and WS3, operated in a manner similar to that disclosed in the aforementioned Lytton et al. application Serial No. 348,406, so as to be in an up position, as illustrated, when the respective weigh pan is up, and in a down position when that weigh pan is filled with the predetermined quantity of material fed thereto. However, in this application the WS switches are of the single pole double throw type, as opposed to the single pole single throw type in that Lytton et al. application, so that herein the movable arm of each such switch completes a circuit in its down position as well as in its up position, and does not just merely open a circuit when moved from its up position to its down position by the respective weigh pan. The purpose of completing a circuit in the down position for these switches will become clear during the following description of the operation of the overall system.

As previously indicated, a multi-layered stream of fibrous material may be delivered to any desired type of equipment which can utilize or alternatively store the material for a short or long period of time, and this equipment may be of the type which includes a demand indicating means. As fully described in each of the above mentioned Lytton et al. applications, the demand indicating means may take the form of a limit switch, and is therein referred to as a "picker" switch PS. Such a switch may also be utilized in conjunction with this invention, and under such circumstances closure of switch PS in the accompanying drawing indicates that the auxiliary equipment requires more material from conveyor 14, while opening thereof, for example automatically as by a level control effectively floating on top of the material in the external equipment, indicates that the equipment presently needs no more material from conveyer 14. As the description of the operation of the system of this invention proceeds, it will be more apparent that delivery of material by conveyer 14 may be controlled by opening and closing switch PS, but for purposes of explaining the operation it will be assumed that this switch is closed.

With switch PS closed, initial closure of power switch 20 causes several things to happen simultaneously. One of these is the immediate energization of the coil of the conveyor motor relay CR by virtue of current flowing from switch 20 through lines 60 and 62, normally closed relay switch 58, closed picker switch PS, line 64, normally closed relay switch 46, lines 66 and 68, through the coil of relay CR and back to the main line 70. This closes the relay switch contacts 24 to apply a 3-phase signal to motor 16 and cause conveyor 14 to start running.

At the same time, closure of power switch 20 also immediately effects energization of the feed relays FR. It will be recalled that since weigh pans W are at this time in their up position, the respective switches WS which they operate are also in their up position. This causes completion of an energizing circuit for each of the coils of the feeding relays FR. For example, current from power switch 20 on line 72 proceeds via lines 74, 76, and weigh switch WS1 in its illustrated position to line 78 and one side of the coil of relay FR1. The other coil side of this relay is connected in parallel with the corresponding coil sides of relays FR2 and FR3, to the common return line 80, which returns to the power input line 70 via the normally closed switch contact 50 of relay TD1 and lines 82 and 84. When this circuit is so completed, relay FR1 is energized, and for similar reasons relays FR2 and FR3 are also energized at this same time, to cause their respective sets of switches 12 to close and energize the respective feed motors FM. Accordingly, each of the feeders F begins to supply its associated weigh pan W with the respective material that is to be collected and weighed thereby. At the same time as feed relay switches 12 close, the respective single pole switch 22 of each of the feed relays also closes, and each one completes the same circuit to effect energization of the DIL relay coil. That circuit includes line 86 from power switch 20 to one side of the coil, and from the other side line 88 via switches 22 to line 80 and normally closed TD1 relay switch 50 back over lines 82 and 84 to power line 70. Since the feed relay switches 22 are connected in parallel between lines 80 and 88, it will be appreciated that relay DIL remains energized until all three of the switches 22 are opened by de-energization of all three of the feed relays FR1, FR2, and FR3.

At this juncture in the explanation of the operation, it will be convenient to recall that, so far, the conveyor has been started and is running, all three of the feed motors FM have been started to effect feeding of respective materials into the weigh pans W1, W2, and W3, with switches WS1, WS2 and WS3 being in their upward position until such time as the respective weigh pan measures out a predetermined quantity of material and drops downward so as to move its weigh switch downward also, against its lower switch contact. Also, due to the energization of the feed motors, relay DIL has been energized, thereby closing its switch 36 and opening its switch 38.

Now, assume that before cam 28 operates the dump or discharge switch 34, all of the weigh pans have measured out their respective predetermined quantities of material and have dropped down so as to move their respective switches WS downward against their lower contacts.

Then, when switch 34 is closed by cam 28, current from power switch 20 on line 72 passes through dump switch 34 to lines 90 and 92, causing relay TD2 to be energized by virtue of completion of the circuit via lines 94 and 96 back to the main power line 70. As above indicated, the switch contacts of relay TD2 immediately are operated upon energization of its coil. Accordingly, the normally closed contacts or switch 58 immediately opens and breaks the previously established circuit to the conveyer motor relay CR, thereby opening its switch contacts 24 and de-energizing motor 16. At the same time, the normally open switch contact 54 closes to apply current from the power switch via lines 60 and 98 to line 100 and the input terminals of the normally open relay switches 36 and 40 respectively associated with relays DIL and TD1. Relay TD1 is not yet energized so its switch 40 is still open, and since the assumption above made for this initial description of operation is that all three of the weigh pans W were full and have dropped so as to move the weigh switches WS downward and de-energize all three of the feed relays FR, thereby opening all three of the switches 22, relay DIL is de-energized meaning that its switch contact 36 is now open. The instance where this contact is closed to effect interlocking functions while one or more of the weigh pans continue to fill, will be considered later.

The other two normally open switch contacts 52 and 56 of relay TD2 immediately close upon closure of dump switch 34, and under the circumstances of all the weigh switches WS1, WS2 and WS3 being in their downward positions at this time, two events occur simultaneously. One is the re-energization of the conveyer motor relay CR. This occurs by virtue of the main power current on line 72 being now diverted by all three of the weigh switches WS to line 102 and from there to line 104, and thence through the now closed TD2 relay switch 52 over line 106 and through the normally closed DIL relay contact 38 to the still closed TD1 switch contact 48 to line 108 to cause energization of the coil of relay TD1, the other side of which is returned to the power input line 70 via lines 110 and 96. Energization of relay TD1 immediately operates all of its switch contacts, causing closure of switch contact 42 whereby relay TD1 is maintained energized as long as the current continues to be applied to line 102 by any one of the weigh switches WS, thereby bypassing the DIL switch contact 38 and the TD2 switch contact 52.

Energization of relay TD1 and its immediate closure of switch contact 40 completed a power circuit stemming from now closed TD2 relay contact 54 via lines 111 and 100, to apply power onto lines 113 and 68 and consequently effected re-energization of conveyer motor relay CR. This causes the conveyor to start operating again, for purposes of receiving the discharge.

At the same time as relay TD1 was energized, the current supplied over line 102 from closure of the weigh switches WS and onto line 108 in the manner above desicrbed, proceeds from junction 112 downward (in the illustration, as well as upward to energize TD1 as previously explained) through the still closed switch 56 of relay TD2 onto line 114 to effect energization of each of the material discharge means such as the pneumatically -operated solenoid valves V1, V2 and V3, thereby releasing the measured materials from the respective weigh pans simultaneously onto the running conveyer 14.

As previously mentioned, relay TD2 has associated with it a delay time effective to delay return of its switch contacts to normal after de-energization of the relay coil. This delay assures sufficient dump time, i.e., sufficient running time of the conveyer, to allow all of the collected material to be dumped from each of the weigh pans W, and it will be appreciated that since the DIL switch contact 36 is open and conveyer 14 has been run since initial closure of the dump switch 34, energization of the TD2 relay coil ceased as soon as the TD1 relay contact 40 closed and caused the conveyer 14 to run sufficiently to allow the dump switch to reopen. As soon as the delay time of relay TD2 runs out, switch contacts 54 and 56 return to their normally open position respectively to de-energize the conveyer motor relay CR and the discharge valves V. The former is effected notwithstanding the concurrent closure of switch contact 58, since the TD1 switch contact 46 is still open.

Relay TD1 remains energized until the last one of the weigh pans W moves its switch WS off its lower contact in the return to the empty position for the weigh pans, so that line 102 no longer has any current delivered to it from any one of the weigh switches WS. This deenergizes the relay, but its switch contacts remain operated for a predetermined length of time so as to allow the weigh pans to stop any bouncing or the like and reach an equilibrium condition in which they can again receive their respective material from the feeders. As soon as this delay time of relay TD1 elapses, all of its switch contacts return to their normal (illustrated) position. The immediate effect thereof is to cause conveyer 14 to start running again by virtue of relay CR being reenergized by the re-closure of relay switch contact 46, while the re-closure of relay contact 50 completes the circuit again to feed relays FR1, FR2 and FR3 to energize all three of these relays and therefore all of the feed motors and the interlock relay DIL, whereby another cycle of operation is started with the weigh pans W being fed again with the respective materials from feeders F.

Now, for the second cycle of operation description, let it be assumed that the weigh pans have not all weighed out their respective amounts of material by the time the dump switch 34 is next closed by cam 28. Under such circumstances, the DIL relay is still energized since at least one of the three feed relay switch contacts 22 is still closed (and, of course, the TD1 relay contact 50 is still closed). Therefore, upon closure of dump switch 34 which causes initial energization of relay TD2, this relay is held energized even if switch 34 reopens, by virtue of an auxiliary energizing or conditional holding circuit to line 92 leading to the coil of relay TD2. This auxiliary energizing circuit involves the TD2 switch contact 54, which is now at least temporarily closed, line 100, the now closed interlock relay switch contact 36, and line 116 which connects back to line 92. In effect, the DIL switch contact 36 causes relay TD2 to remember a closure of the dump switch 34 until such time as the interlocking relay DIL is de-energized by virtue of all the feed relays FR opening their respective switch contacts 22. In other words, even if dump switch 34 is reopened because of coasting of a conveyer 14 and consequent removal of cam 28 from switch arm 32, the conveyer relay CR having been de-energized upon initial energization of relay TD2 by the consequent opening of its switch 58, relay TD2 does not forget the initial closure of dump switch 34 in each cycle as long as the interlock relay contact 36 remains closed.

It makes no difference whether one or two or any number less than all of the weigh pans is or are in a downward position so that their respective switches WS are also downward, since if any one of the weigh pans has still not measured out its predetermined quantity of material, the energization on line 102 cannot be effective to energize relay TD1 since the DIL relay contact 38 is still open. Not until that contact closes and thereby interlocks the two time delay relays is relay TD1 energized via the TD2 relay contact 52 in the manner previously explained. Operation thereafter is accomplished in the same manner as described above.

In either situation of the weigh pans being filled or unfilled, when the dump switch 34 closes, if that switch immediately reopens due to coasting of the conveyer, or for any other reason, it is apparent from the foregoing description that there is no further movement of conveyer 14 unless all of the pans are ready to be discharged of their weighed out material, thereby precluding the problem of prior systems of this general nature in which some stacks of material resulting on the conveyer may be missing one or more types of the different materials which should be present therein.

In the system above-described and illustrated, there could be a premature re-energization of the conveyer drive motor 16 by operation of relay CR when dump switch 34 reopened if it were not for the interlocked holding circuit (comprising relay contacts 54 and 36), which maintains relay TD2 energized until all weight measurements are completed and the dump interlock relay DIL therefore opens its contact 36. Of course, since relay TD2 inherently delays being de-energized, reopening of dump switch 34 might not cause the conveyer to start running prematurely, but then again it could if all weight measurements were not completed before the de-energization delay of TD2 expires. The means for positively preventing inadvertent or premature restarting of the conveyer, i.e., prevents automatic restarting of the conveyer before completion of weight measurement, includes relay contact 54, line 100, relay contact 36, and line 116. The delay feature of relay TD2 may be considered a part thereof since it plays a certain role for a short time in preventing automatic restart, but the main purpose of the delay feature of relay TD2 is, as previously indicated, to assure that the conveyer does run during dump time and to assure that the dump time is long enough for complete dumping.

Indicator lights may be used with the system as desired. For example, an incandescent lamp 118 may be connected across the coil of relay TD2, as by connection to lines 90 and 96, to give an indication as to when that relay is energized. Since line 96 is continuously energized, closure of dump switch 34 not only energizes relay TD2 but also lamp 118, indicating the dump cycle is at least in condition to start and will do so as soon as the now closed relay switch 56 becomes energized after the interlock of relay DIL releases. Even when dump switch 34 re-opens, as above explained lamp 118 stays lighted until line 92, and consequently relay TD2, is de-energized by the release of delay DIL. This latter condition occurs, it will be recalled, only after all the weigh switches WS are moved to their downward positions, thereby opening all the FR feed relay switch contacts 22 to effect de-energization of relay DIL and an opening of its contact 36. This not only de-energizes relay TD2 and lamp 118 but for the first time energizes the TD2 relay dump switch contact 56 which then stays closed for the delay release time of relay TD2. Accordingly, if lamp 118 remains lighted beyond the time when relay TD2 should be de-energized, a failure to dump may be indicated.

On the other hand, lamp 120 because of its connection between the TD1 relay switch contact 44 and junction 112 will light as long as that contact stays closed to give an indication, by prolonged lighting, of failure of the equipment to recycle, for example because all switches WS did not move back to their up positions after dump is complete.

It is therefore apparent that this invention has provided apparatus which will accomplish all of the objects and advantages, and has all of the features herein mentioned. It will be appreciated by one of ordinary skill in the art after reading this disclosure that many modifications of the particular exemplary embodiment described in detail above may be made without departing from the scope of the invention as defined by the appended claims.

What is claimed is:

1. A system for controlling operation of equipment of the type that collects material in discharge means while effectively measuring the material by sensing for a given quantity of a predetermined characteristic related to said material for a desired operation of the equipment and of the type that said discharge means releases the collected material onto conveyer means movable by energizable means, said system comprising:

means for energizing said energizable means for causing said conveyer means to run, switch means movable to first and second positions in response to the running of said conveyer means, means operable in response to movement of the switch means to said first position for disconnecting said energizing and energizable means, means for sensing completion of measurement of said given quantity of said characteristic, and means operable in response either to event (A) which is the sensing of measurement completion as aforesaid or to event (B) which is the movement of said switch means to said first position, according to which one of said (A) and (B) events occurs last as long as the other thereof has already occurred and, in the case of event (A) occurring last, notwithstanding any intervening return of said switch means from said first position to said second position, for automatically re-energizing said energizable means via said energizing means and causing said discharge means to release its collected material onto the running conveyor means.

2. In a cyclic system which includes equipment for feeding a plurality of different materials into respective weighing containers which independently operate to weigh out a respective predetermined quantity of the respectively received material and which has a respective discharge means for releasing the weighed material onto conveyer means movable by energizable means, the improvement comprising:

respective weight sensing means operable by said weighing containers to indicate when the respective container is full to the extent of having weighed out the respective predetermined quantity of material and when non-full to that extent, respective means operable in response to the sensing by said sensing means of a non-full condition for the respective weighing container for effecting feed of respective material into that weighing container, interlock means coupled to be energized while any one of the feed effecting means is energized, said interlock means having one normally open switch means which closes during energization of the interlock means and one normally closed switch means which opens during energization of the interlock means, means for energizing said energizable means for causing said conveyer means to move, discharge switch means normally open but movable to a closed position in response to movement of the conveyer means to a predetermined point with respect to said weighing containers, means for sensing closure of said discharge switch means and for de-energizing said energizable means upon closure thereof to cause stopping of said conveyor means, means operated by said closure sensing means and including said normally open interlock switch means for remembering the sensing of said discharge switch means closure until, and even if said discharge switch means reopens before, all of said weight sensing means indicate their respective containers have received the respective given quantity of material, said feed effecting means being respectively de-energized upon sensing by the weighing container sensing means of the respective given quantity of material and thereby de-energizing said interlock means when all of the feed effecting means have been de-energized, said discharge switch closure sensing means being effective upon the de-energization of said interlock means via said normally closed interlock switch means to cause re-energization of said conveyer energizable means and concurrently to effect operation of each of the said weighing container discharge means for a time predetermined by an inherent delay in the said closure sensing means, said closure sensing means including means for de-energizing said conveyer energizable means upon the passage of said predetermined time, and means for preventing re-energization of said feed effecting means and interlock means until the passage of another predetermined amount of time sufficient to allow another cycle to start after that time by the feeding of more material into the respective weighing containers, whereby during each cycle said conveyer means invariably receives a full amount of the respective materials from each of said containers.

3. The improvement of claim 2 wherein each of said weight sensing means is a single pole two position switch, each said feed effecting means including a relay having a coil connected to one of said positions of a respective single pole switch to effect a first conditional energization connection, said relay coils being otherwise connected together and through a first normally closed contact of a first delay release relay to effect a second conditional energization connection, a second delay release relay having a coil coupled to be energized by closure of said discharge switch means and held energized by said interlock means as long as any one of said feed relay coils is energized, the other positions of said single pole switches being connected together and through a normally open contact of said second relay and the said normally closed switch of said interlock means and a second normally closed contact of said first relay to cause energization of the latter only when all said containers are full as aforesaid and said single pole switches are therefore all in their second positions to effect deenergization of said interlock means and to cause energization of said discharge means while said second relay releases and said conveyer means operates.

4. In a cyclic system of the type that collects material in discharge means while effectively measuring the material by sensing for a given quantity of a predetermined characteristic related to said material for a desired operation of the system during a portion of each cycle and has movable receiving means for receiving from said discharge means measured material collected therein, the improvement, in combination with means operable in response to movement of said movable receiving means for stopping movement thereof during any cycle that it is necessary to wait on the completion of measurement of said given quantity and for automatically restarting movement of said receiving means upon said measurement completion in every such cycle and in at least some of such cycles automatically restarting movement of the receiving means inadvertently before that completion of measurement because of a coasting movement of the receiving means after operation of the said stopping means, of means coupled to the said stopping and restarting means for positively preventing said inadvertent restarting movement of the receiving means notwithstanding said coasting movement and until said measurement completion.

5. A system as in claim 4 wherein said restarting preventing means includes holding means operated in response to operation of said stopping means for effectively holding the stopping means continuously operative to stop movement of the receiving means until sensing of measurement completion even if the restarting means is operated before then.

6. A system as in claim 5 including first normally open switch means which closes during measurement of said quantity and reopens in response to said measurement completion, said stopping and restarting means being connected to said holding means and having mutually exclusive circuit energizing and circuit de-energizing conditions respectively for stopping and restarting movement of said receiving means and to which said stopping and starting means is operable in response to movement of said receiving means, said holding means being energized when said stopping and restarting means is in said circuit energizing condition, and means, including second normally open switch means which closes when said holding means is energized and which is serially connected to said first switch means, for maintaining said holding means energized until said first switch reopens as aforesaid notwithstanding any earlier change in said stopping and restarting means to said circuit de-energizing condition.

7. A system for controlling operation of equipment of the type that collects material in discharge means while effectively measuring the material by sensing for a given quantity of a predetermined characteristic related to said material for a desired operation of the equipment and of the type that said discharge means releases the collected material onto conveyer means movable by energizable means, said system comprising:

means for energizing said energizable means for causing said conveyer means to run, switch means movable to first and second positions in response to the running of said conveyer means, means operable in response to movement of the switch means to said first position for disconnecting said energizing and energizable means whereby said conveyer means may however continue temporarily to run because of inertia and thereby cause said switch means to move to said second position, means for sensing completion of measurement of said given quantity of said characteristic, and means interlocking said disconnecting and sensing means for holding the disconnecting means operated until completion of measurement is sensed as aforesaid, even if said switch means moves to said second position in the meantime, for invariably preventing re-connection of said energizing and energizable means until said measurement completion.

8. A system for controlling operation of equipment of the type that collects material in discharge means while effectively measuring the material by sensing for a given quantity of a predetermined characteristic related to said material for a desired operation of the equipment and of the type that said discharge means releases the collected material onto receiving means movable by energizable means, said system comprising:

means for energizing said energizable means for causing said receiving means to run, circuit means operated between two conditions upon movement of said movable receiving means, means operable in response to one of said conditions for disconnecting said energizing and energizable means whereby said receiving means may however continue temporarily to move because of inertia whereupon said circuit means may consequently be changed to its other condition, means for sensing completion of measurement of said given quantity of said characteristic, and means interlocking said disconnecting and sensing means for holding the disconnecting means operated until completion of measurement is sensed as aforesaid, even if said circuit means changes to said other condition in the meantime, for invariably preventing re-connection of said energizing and energizable means until said measurement completion.

References Cited by the Examiner

UNITED STATES PATENTS

| | | | |
|---|---|---|---|
| 2,638,305 | 5/1953 | Miller | 177—103 X |
| 3,073,402 | 1/1963 | Green et al. | 177—80 |
| 3,132,709 | 5/1964 | Lytton | 177—114 |
| 3,142,348 | 7/1964 | Lytton | 177—114 |

LEO SMILOW, *Primary Examiner.*